US012794013B2

(12) United States Patent
Ryu et al.

(10) Patent No.: US 12,794,013 B2
(45) Date of Patent: Nov. 10, 2026

(54) METHOD FOR MANUFACTURING GEL POLYMER ELECTROLYTE SECONDARY BATTERY AND GEL POLYMER ELECTROLYTE SECONDARY BATTERY MANUFACTURED THEREBY

(71) Applicant: LG ENERGY SOLUTION, LTD., Seoul (KR)

(72) Inventors: Ji-Hoon Ryu, Daejeon (KR); Yong-Hee Kang, Daejeon (KR); Su-Rim Lee, Daejeon (KR); Jae-Won Lee, Daejeon (KR); Jung-Hoon Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 578 days.

(21) Appl. No.: 18/266,698

(22) PCT Filed: May 30, 2022

(86) PCT No.: PCT/KR2022/007698

§ 371 (c)(1),
(2) Date: Jun. 12, 2023

(87) PCT Pub. No.: WO2022/250519

PCT Pub. Date: Dec. 1, 2022

(65) Prior Publication Data

US 2024/0047741 A1 Feb. 8, 2024

(30) Foreign Application Priority Data

May 28, 2021 (KR) ........................ 10-2021-0069524

(51) Int. Cl.
*H01M 10/00* (2006.01)
*H01M 10/052* (2010.01)
(Continued)

(52) U.S. Cl.
CPC ..... *H01M 10/0565* (2013.01); *H01M 10/052* (2013.01); *H01M 10/058* (2013.01);
(Continued)

(58) Field of Classification Search
CPC ........... H01M 10/0565; H01M 10/058; H01M 10/052; H01M 50/105; Y02E 60/10
See application file for complete search history.

(56) References Cited

U.S. PATENT DOCUMENTS

| | | | |
|---|---|---|---|
| 6,852,138 | B1 | 2/2005 | Topsoe et al. |
| 2002/0187402 | A1 | 12/2002 | Hataya |

(Continued)

FOREIGN PATENT DOCUMENTS

| | | | |
|---|---|---|---|
| CN | 104733777 | A | 6/2015 |
| CN | 105655636 | A | 6/2016 |

(Continued)

OTHER PUBLICATIONS

Shi et al., Preparation Method Of Lithium Ion Battery With Organic-inorganic Composite Gel Polymer Electrolyte, Mar. 2019, See the Abstract. (Year: 2019).*

(Continued)

*Primary Examiner* — Tiffany Legette
*Assistant Examiner* — Monique M Wills
(74) *Attorney, Agent, or Firm* — Morgan, Lewis & Bockius LLP

(57) ABSTRACT

A secondary battery has a structure including an internal core portion containing an electrolyte having a relatively lower crosslinking degree, and surrounded with a peripheral portion containing an electrolyte having a relatively higher crosslinking degree. It is possible to provide an effect of improving both ion conductivity and mechanical properties by virtue of such structural characteristics. The electrolyte portion having a lower crosslinking degree is confined by (Continued)

10 the electrolyte having a higher crosslinking degree to provide an effect of preventing electrolyte leakage. The secondary battery can be obtained by a simple method that includes crosslinking only the peripheral portion before the core portion reaches to a crosslinking temperature and is crosslinked under an environment preheated to the crosslinking temperature or higher. As a result, there is no adverse effect upon the processing efficiency, since any separate device or system line is not required to carry out the crosslinking.

17 Claims, 1 Drawing Sheet

(51) Int. Cl.
*H01M 10/0565* (2010.01)
*H01M 10/058* (2010.01)

(52) U.S. Cl.
CPC ............... *H01M 2300/0082* (2013.01); *H01M 2300/0085* (2013.01)

(56) References Cited

U.S. PATENT DOCUMENTS

| | | | |
|---|---|---|---|
| 2003/0104283 | A1 | 6/2003 | Yamaguchi et al. |
| 2010/0239900 | A1 | 9/2010 | Take et al. |
| 2018/0254522 | A1 | 9/2018 | Park et al. |
| 2019/0214679 | A1 | 7/2019 | Bazin et al. |
| 2021/0043934 | A1 | 2/2021 | Shin et al. |
| 2021/0135273 | A1 | 5/2021 | Saitou et al. |
| 2024/0047741 | A1 | 2/2024 | Kang et al. |

FOREIGN PATENT DOCUMENTS

| | | | | | |
|---|---|---|---|---|---|
| CN | 109546205 | A | * | 3/2019 | .......... H01M 10/056 |
| CN | 208846852 | U | * | 5/2019 | |
| CN | 112585795 | A | * | 3/2021 | .......... H01M 50/443 |
| EP | 2960967 | A1 | | 12/2015 | |
| JP | 2001-210373 | A | | 8/2001 | |
| JP | 2002-510843 | A | | 4/2002 | |
| JP | 3654180 | B2 | | 6/2005 | |
| JP | 2009-087929 | A | | 4/2009 | |
| JP | 2010-129239 | A | | 6/2010 | |
| JP | 2013-140676 | A | | 7/2013 | |
| JP | 2014-013659 | A | | 1/2014 | |
| JP | 2018-107120 | A | | 7/2018 | |
| JP | 2023-545114 | A | | 10/2023 | |
| KR | 2001-35535 | A | | 2/2001 | |
| KR | 10-2001-0100242 | A | | 11/2001 | |
| KR | 10-2003-0035764 | A | | 5/2003 | |
| KR | 10-2017-0055644 | A | | 5/2017 | |
| KR | 10-2019-0060522 | A | | 6/2019 | |
| KR | 10-2013914 | B1 | | 8/2019 | |
| KR | 102026621 | B1 | * | 9/2019 | ........ H01M 10/0565 |
| KR | 10-2019-0125228 | A | | 11/2019 | |

OTHER PUBLICATIONS

Park et al.Gell Electrolyte Having Double Crosslinded Polymer Network and Ionic Liquid, Method of the Gell Electrolyte, and Energy Storing Apparatus Including the Gell Electrolyte, Sep. 2019, See the Abstract. (Year: 2019).*

Yang et al., Novel Efficient Cold Automatic Vacuum Oven, May 2019, See the Abstract. (Year: 2019).*

Okada et al., Resin Dispersed Electrolyte, Polymer Gel Electrolyte And Manufacturing Method Thereof And Secondary Battery And Manufacturing Method Thereof, Mar. 2021, See the Abstract. (Year: 2021).*

International Search Report (with partial translation) issued Sep. 16, 2022 with Written Opinion in the corresponding International Patent Application No. PCT/KR2022/007698.

Office Action dated May 9, 2025 issued in corresponding Japanese Patent Application No. 2023-521782. (Note: JP 2013-140676, and JP 2002-510843 already submitted.).

Office Action issued in corresponding Japanese Patent Application No. 2023-521782, dated Mar. 25, 2024.

The extended European Search Report (EESR) dated May 7, 2025, issued in corresponding EP Patent Application No. 21811710.7. (Note: US 2021/0135273 A1 was previously cited.).

Office Action dated Jun. 23, 2026 issued in the corresponding Japanese Patent Application No. 2025-015543.

Office Action dated Jul. 18, 2026 issued in the corresponding Chinese Patent Application No. 202280030995.9.

* cited by examiner

METHOD FOR MANUFACTURING GEL POLYMER ELECTROLYTE SECONDARY BATTERY AND GEL POLYMER ELECTROLYTE SECONDARY BATTERY MANUFACTURED THEREBY

TECHNICAL FIELD

The present application claims priority to Korean Patent Application No. 10-2021-0069524 filed on May 28, 2021 in the Republic of Korea. The present disclosure relates to a method for manufacturing a lithium secondary battery including a gel polymer electrolyte and a gel polymer electrolyte secondary battery obtained thereby.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PCs and even to energy for electric vehicles. In this context, electrochemical devices have been most spotlighted. Among such electrochemical devices, development of rechargeable secondary batteries has been focused.

Among the commercially available secondary batteries, lithium secondary batteries developed in the early 1990's have been spotlighted, since they have a higher operating voltage and significantly higher energy density as compared to conventional batteries, such as Ni—MH, Ni—Cd and sulfuric acid-lead batteries using an aqueous electrolyte.

Such lithium secondary batteries may be classified into lithium-ion batteries using a liquid electrolyte and lithium polymer batteries using a polymer electrolyte, depending on the electrolyte used specially therefor.

Lithium-ion batteries have an advantage of high capacity, but have a risk of electrolyte leakage and explosion due to the use of a lithium salt-containing liquid electrolyte. Therefore, lithium-ion batteries are disadvantageous in that they require a complicated battery design in order to provide against such a disadvantage.

On the other hand, lithium polymer batteries use a solid polymer electrolyte or an electrolyte-containing gel polymer electrolyte, and thus show improved safety and may have flexibility. Therefore, lithium polymer batteries may be developed into various types, such as compact batteries or thin film-type batteries. The gel polymer electrolyte may be classified into a coating-type gel polymer electrolyte and an injection-type gel polymer electrolyte, depending on the process for preparing the same. The injection-type gel polymer electrolyte may be prepared by injecting a liquid electrolyte including a crosslinkable monomer to a cell, wetting an electrode assembly with the liquid electrolyte, and carrying out a crosslinking process. During the crosslinking, the electrolyte forms a matrix and is converted into a gel-like electrolyte having no flowability.

Such a gel electrolyte shows no electrolyte flowability, and thus is advantageous in that it causes no problems of heat resistance, safety and leakage, and improves the cell strength so that the cell may be strong against external impact to provide high physical safety. However, the gel electrolyte shows lower ion conductivity and higher resistance as compared to a liquid electrolyte. Therefore, a battery using such a gel electrolyte tends to show lower life characteristics as compared to a battery using a liquid electrolyte alone. Under these circumstances, there is a need for improvement of the ion conductivity of a gel polymer electrolyte.

DISCLOSURE

Technical Problem

The present disclosure is designed to solve the problems of the related art, and therefore the present disclosure is directed to providing a secondary battery including a gel polymer electrolyte and having high ion conductivity. The present disclosure is also directed to providing a method for manufacturing a secondary battery including an injection-type gel polymer electrolyte using radical thermal initiation reaction, wherein the gel polymer electrolyte has improved ion conductivity. It will be easily understood that the objects and advantages of the present disclosure may be realized by the means shown in the appended claims and combinations thereof.

Technical Solution

According to the first embodiment of the present disclosure, there is provided a method for manufacturing a secondary battery containing a gel polymer electrolyte, including the steps of: (S1) introducing an electrode assembly and a composition for forming a gel polymer electrolyte to a battery casing to obtain a preliminary battery; (S2) carrying out crosslinking of the composition for forming a gel polymer electrolyte; and (S3) cooling the resultant product of step (S2), wherein step (S2) is carried out in a heating device, the heating device is preheated to a predetermined temperature before carrying out step (S2), the secondary battery includes a gel polymer electrolyte in which the gel polymer electrolyte is partially crosslinked to a predetermined crosslinking degree or higher, and the crosslinking degree is increased from the inner part of the secondary battery to the outer part of the gel polymer electrolyte.

According to the second embodiment of the present disclosure, there is provided the method for manufacturing a secondary battery containing a gel polymer electrolyte as defined in the first embodiment, wherein the secondary battery includes a core portion in which the gel polymer electrolyte shows a lower crosslinking degree, and a peripheral portion surrounding the core portion and including the gel polymer electrolyte showing a higher crosslinking degree as compared to the core portion.

According to the third embodiment of the present disclosure, there is provided the method for manufacturing a secondary battery containing a gel polymer electrolyte as defined in the first or the second embodiment, wherein step (S1) includes sealing the battery casing under ambient pressure to obtain the preliminary battery.

According to the fourth embodiment of the present disclosure, there is provided the method for manufacturing a secondary battery containing a gel polymer electrolyte as defined in any one of the first to the third embodiments, wherein the composition for a gel polymer electrolyte includes: a lithium salt; a non-aqueous organic solvent; a polymerization initiator; and at least one polymerizable compound selected from the group consisting of a polymerizable monomer, oligomer and copolymer.

According to the fifth embodiment of the present disclosure, there is provided the method for manufacturing a secondary battery containing a gel polymer electrolyte as defined in any one of the first to the fourth embodiments, wherein step (S2) is carried out at a temperature of 60° C. or higher.

According to the sixth embodiment of the present disclosure, there is provided the method for manufacturing a secondary battery containing a gel polymer electrolyte as defined in any one of the first to the fifth embodiments, wherein a room-temperature aging step is further carried out before carrying out step (S2).

According to the seventh embodiment of the present disclosure, there is provided the method for manufacturing a secondary battery containing a gel polymer electrolyte as defined in the sixth embodiment, wherein a vacuum treatment step is further carried out after carrying out the room-temperature aging step.

According to the eighth embodiment of the present disclosure, there is provided the method for manufacturing a secondary battery containing a gel polymer electrolyte as defined in any one of the first to the seventh embodiments, wherein the cooling in step (S3) is carried out in a cooling chamber controlled to a temperature of room temperature or lower in such a manner that the battery temperature may reach the atmosphere temperature of the cooling chamber within 10 minutes.

According to the ninth embodiment of the present disclosure, there is provided a secondary battery which includes a gel polymer electrolyte showing a crosslinking degree increasing stepwise or gradually from the inner part of the secondary battery to the outer part of the secondary battery, and has a core portion including a gel polymer electrolyte having a lower crosslinking degree, and a peripheral portion surrounding the core portion and including a gel polymer electrolyte having a higher crosslinking degree as compared to the core portion.

According to the tenth embodiment of the present disclosure, there is provided the secondary battery as defined in the ninth embodiment, wherein the peripheral portion has a crosslinking degree of 80 wt % or more, and the core portion has a crosslinking degree of less than 40 wt %.

Advantageous Effects

The secondary battery according to the present disclosure has a structure including an internal core portion containing an electrolyte having a relatively lower crosslinking degree, and surrounded with a peripheral portion containing an electrolyte having a relatively higher crosslinking degree. It is possible to provide an effect of improving both ion conductivity and mechanical properties by virtue of such structural characteristics. In addition, the electrolyte portion having a lower crosslinking degree is confined by the electrolyte having a higher crosslinking degree to provide an effect of preventing electrolyte leakage. In addition, the secondary battery according to the present disclosure can be obtained by a simple method that includes crosslinking only the peripheral portion before the core portion reaches to a crosslinking temperature and is crosslinked under an environment preheated to the crosslinking temperature or higher. As a result, there is no adverse effect upon the processing efficiency, since any separate device or system line is not required to carry out the crosslinking.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

FORM FOR IMPLEMENTATION

Figure 1:
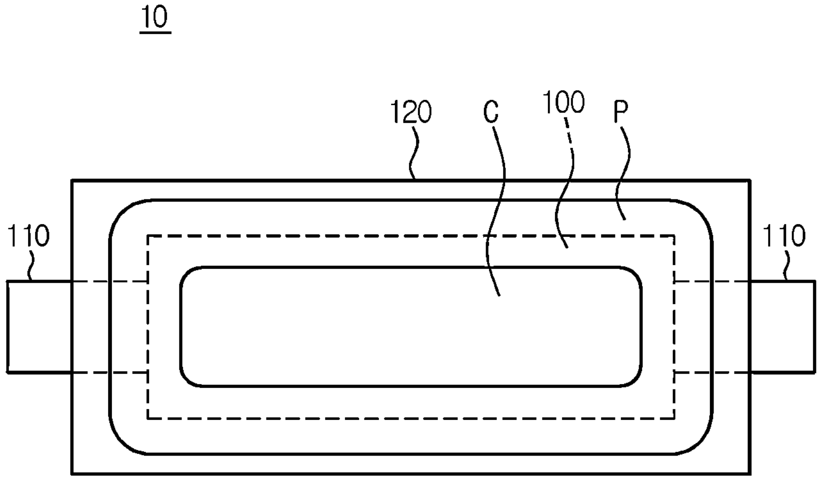
FIG. 1 is a sectional view illustrating the secondary battery according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part includes an element' does not preclude the presence of any additional elements but means that the part may further include the other elements.

As used herein, the terms 'about', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

Specific terms used in the following description are for illustrative purposes and are not limiting. Such terms as 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'top' and 'bottom' and related words and expressions show the positions and points in the drawings to which they are referred and should not be limiting. Such terms include the above-listed words, derivatives thereof and words having similar meanings.

Unless otherwise stated, represents a linkage portion between the same or different atoms or end portions of the chemical formulae.

In addition, as used herein, 'substitution' refers to substitution of at least one hydrogen atom bound to a carbon atom with any element other than hydrogen, unless otherwise stated. For example, 'substitution' refers to substitution with a C1-C5 alkyl group or fluorine atom.

Hereinafter, the present disclosure will be explained in more detail with reference to the accompanying drawings.

The secondary battery according to an embodiment of the present disclosure includes an electrode assembly including at least one negative electrode, at least one separator and at least one positive electrode, independently, wherein the negative electrode, separator and the separator are stacked successively in such a manner that the negative electrode and the positive electrode are electrically insulated from each other by the separator. In addition, the secondary battery includes an electrolyte with which the electrode assembly is wetted. According to an embodiment of the present disclosure, the electrolyte in the battery shows a crosslinking degree increasing from the inner part of the battery to the outer part of the battery. In other words, the electrolyte in the core portion of the electrode assembly shows a relative lower crosslinking degree and has flowability, while the electrolyte in the peripheral portion of the electrode assembly shows a higher crosslinking degree as compared to the core portion and has significantly low flowability or has no flowability. Since the core portion is surrounded with the peripheral portion, the electrolyte present in the core portion and having a lower crosslinking degree is encapsulated with the electrolyte having a higher crosslinking degree, and thus may not leak to the outside of the electrode assembly. Meanwhile, according to an embodiment of the present disclosure, a transition portion may be present between the core portion and the peripheral portion, and the transition portion refers to a portion where the crosslinking degree increases from the core portion toward the peripheral portion.

FIG. 1 is a sectional view illustrating the secondary battery 10 according to an embodiment of the present disclosure. Referring to FIG. 1, the battery includes an electrode assembly 100 including a negative electrode, a separator and a positive electrode, stacked successively, and a battery casing 120 in which the electrode assembly is received. The battery may have an electrode tab 110 drawn from the electrode assembly to the outside. In addition, the battery includes an electrolyte with which the electrode assembly is wetted. The core portion C of the electrode assembly includes an electrolyte showing a lower crosslinking degree and having flowability. According to an embodiment of the present disclosure, the electrolyte of the core portion may have a viscosity of 0 or more and cP or less, preferably 15,000 cP or less. Meanwhile, according to an embodiment of the present disclosure, the core portion preferably shows a crosslinking degree of less than 40 wt %.

Meanwhile, the core portion is surrounded with the peripheral portion P, and the electrolyte of the peripheral portion shows a higher crosslinking degree and preferably has no flowability. According to an embodiment of the present disclosure, the electrolyte of the peripheral portion has a relatively higher crosslinking degree as compared to the core portion, and for example, may show a crosslinking degree of 40 wt % or more, preferably 80-100 wt %.

In the battery according to an embodiment of the present disclosure, the core portion shows a crosslinking degree of less than 40 wt % and the peripheral portion shows a crosslinking degree of 80-100 wt %, wherein the difference in crosslinking degree between the peripheral portion and the core portion may be 50 wt % or more. According to a particular embodiment, the inner part of the battery has a peripheral portion and a core portion showing a difference in crosslinking degree of 50 wt % or more therebetween, and a transition portion may be disposed between the peripheral portion and the core portion.

According to an embodiment of the present disclosure, the crosslinking degree may be determined by a method of calculating the ratio of C═C bonds of each electrolyte forming the peripheral portion and the core portion of the electrode assembly through nuclear magnetic resonance (NMR) analysis. However, determination of the crosslinking degree is not limited thereto.

Meanwhile, according to an embodiment of the present disclosure, the peripheral portion may include a transition portion T. The transition portion is positioned between the core portion and the outermost surface of the peripheral portion, and shows a gradual increase in crosslinking degree from the core portion toward the outermost surface of the peripheral portion. In other words, the crosslinking degree increases in the order of the core portion, transition portion and the outermost surface.

Meanwhile, according to an embodiment of the present disclosure, the vacant space of the battery casing beyond the outer boundary of the electrode assembly may be filled with the electrolyte. This is also referred to as a filling portion hereinafter. The electrolyte with which the vacant space of the battery casing is filled is disposed closest to the battery casing and has the highest crosslinking degree, and may be formed integrally with and indivisibly from the peripheral portion and/or the transition portion. The secondary battery according to the present disclosure may be obtained by introducing the electrode assembly to the battery casing, injecting the composition for a gel polymer electrolyte to the battery casing and carrying out crosslinking, as described hereinafter. In this manner, the peripheral portion of the electrode assembly may be formed integrally with the filling portion.

Meanwhile, according to an embodiment of the present disclosure, the peripheral portion and/or the transition portion may be extended even to the outside of the electrode assembly and may partially occupy the filling portion. In other words, the core portion is disposed in the electrode assembly, and may be surrounded directly with the peripheral portion, or may be surrounded with the transition portion, wherein the transition portion may be surrounded with the peripheral portion. In addition, the outer boundary of the electrode assembly may belong to the peripheral portion or the transition portion. In this manner, the liquid-state electrolyte may be disposed in such a manner that it may not be in direct contact with the battery casing.

According to the present disclosure, the positive electrode may include a positive electrode current collector, and a positive electrode active material layer formed on one surface or both surfaces of the positive electrode current collector. The positive electrode active material layer includes a positive electrode mixture, which may include a positive electrode active material, a binder and a conductive material. Herein, the positive electrode mixture does not include an electrolyte with which the positive electrode is wetted. According to the present disclosure, the positive electrode active material layer includes a plurality of pores and has porous properties, wherein the pores are filled with the electrolyte as described above, and the electrolyte may show a low crosslinking degree and have flowability, or may show a high crosslinking degree and is in a solid state having no flowability, depending on where the pores are located in the electrode assembly.

The positive electrode current collector is not particularly limited, as long as it causes no chemical change in the corresponding battery and has conductivity. Particular examples of the positive electrode current collector may include stainless steel, aluminum, nickel, titanium, baked carbon, aluminum or stainless steel surface-treated with carbon, nickel, titanium or silver, or the like.

The positive electrode active material is a compound capable of reversible lithium intercalation/deintercalation, and particular examples thereof include lithium composite metal oxides containing at least one metal, such as cobalt, manganese, nickel or aluminum, and lithium. More particularly, the lithium composite metal oxides may include lithium-manganese oxides (e.g. $LiMnO_2$, $LiMn_2O_4$, etc.), lithium-cobalt oxides (e.g., $LiCoO_2$, etc.), lithium-nickel oxides (e.g., $LiNiO_2$, etc.), lithium-nickel-manganese oxides (e.g., $LiNi_{1-Y}Mn_YO_2$ (wherein 0<Y<1), $LiMn_{2-Z}Ni_ZO_4$ (wherein 0<Z<2)), lithium-nickel-cobalt oxides (e.g., $LiNi_{1-Y1}Co_{Y1}O_2$(wherein 0<Y1<1)), lithium-manganese-cobalt oxides (e.g., $LiCo_{1-Y2}Mn_{Y2}O_2$ (wherein 0<Y2<1), $LiMn_{2-Z1}Co_{Z1}O_4$ (wherein 0<Z1<2)), lithium-nickel-manganese-cobalt oxides (e.g., $Li(Ni_pCo_{q1}Mn_{r1})O_2$ (0<p<1, 0<q<1, 0<r1<1, p+q+r1=1) or $Li(Ni_{p1}Co_{q1}Mn_{r2})O_4$ (0<p1<2, 0<q1<2, 0<r2<2, p1+q1+r2=2)), lithium-nickel-cobalt-transition metal (M) oxides (e.g., $Li(Ni_{p2}Co_{q2}Mn_{r3}MS_2)O_2$ (wherein M is selected from the group consisting of Al, Fe, V, Cr, Ti, Ta, Mg and Mo, and each of p2, q2, r3 and s2 represents the atomic proportion of each element satisfying 0<p2<1, 0<q2<1, 0<r3<1, 0<s2<1, and p2+q2+r3+s2=1)), or the like, and any one compound, or two or more compounds of them may be used.

Particularly, the lithium composite metal oxides may include $LiCoO_2$, $LiMnO_2$, $LiNiO_2$, lithium nickel manganese cobalt oxides (e.g. $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$, or the like), or lithium nickel cobalt aluminum oxides (e.g., $Li(Ni_{0.8}Co_{0.15}Al_{0.05})O_2$, or the like) with a view to improvement of the capacity characteristics and stability of a battery.

The positive electrode active material may be used in an amount of 50-99 wt % based on 100 wt % of the positive electrode mixture.

The binder is an ingredient which assists binding between the active material and the conductive material and binding to the current collector. In general, the binder may be added in an amount of 1-30 wt % based on 100 wt % of the positive electrode mixture. Particular examples of the binder include polyvinylidene fluoride (PVDF), polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene monomer (EPDM), sulfonated EPDM, styrene-butadiene rubber, fluoro-rubber, various copolymers, or the like.

The conductive material may be added in an amount of 1-30 wt % based on the total weight of the solid content in the positive electrode mixture.

Such a conductive material is not particularly limited, as long as it causes no chemical change in the corresponding battery and has conductivity. Particular examples of the conductive material include: carbon powder, such as carbon black, acetylene black (or denka black), ketjen black, channel black, furnace black, lamp black or thermal black; graphite powder, such as natural graphite, artificial graphite or graphite having a well-developed crystal structure; conductive fibers, such as carbon fibers or metallic fibers; carbon fluoride; metal powder, such as aluminum or nickel powder; conductive whisker, such as zinc oxide or potassium titanate; conductive metal oxide, such as titanium oxide; and conductive materials, such as polyphenylene derivatives.

According to the present disclosure, the negative electrode may include a negative electrode current collector, and a negative electrode active material layer formed on one surface or both surfaces of the negative electrode current collector. The negative electrode active material layer includes a negative electrode mixture, which may include a negative electrode active material, a binder and a conductive material. Herein, the negative electrode mixture does not include an electrolyte with which the negative electrode is wetted. According to the present disclosure, the negative electrode active material layer includes a plurality of pores and has porous properties, wherein the pores are filled with the electrolyte as described above, and the electrolyte may show a low crosslinking degree and have flowability, or may show a high crosslinking degree and is in a solid state having no flowability, depending on where the pores are located in the electrode assembly.

The negative electrode current collector generally has a thickness of 3-500 μm. The negative electrode current collector is not particularly limited, as long as it has high conductivity, while not causing any chemical change in the corresponding battery. Particular examples of the negative electrode current collector include copper, stainless steel, aluminum, nickel, titanium, baked carbon, or copper or stainless steel surface-treated with carbon, nickel, titanium, silver, etc., aluminum-cadmium alloy, or the like. In addition, similarly to the positive electrode current collector, the negative electrode current collector may have fine surface irregularities formed on the surface thereof to increase the adhesion of a negative electrode active material, and may have various shapes, such as a film, a sheet, a foil, a net, a porous body, a foam or a non-woven web body.

In addition, the negative electrode active material may include at least one selected from the group consisting of a carbonaceous material capable of reversible lithium-ion intercalation/deintercalation, metal or alloy of metal with lithium, metal composite oxide, material capable of lithium doping/dedoping, and a transition metal oxide.

The carbonaceous material capable of reversible lithium-ion intercalation/deintercalation may include any carbonaceous negative electrode active material used currently in a lithium-ion secondary battery with no particular limitation. Typical examples of the carbonaceous material include crystalline carbon, amorphous carbon or a combination thereof. Particular examples of the crystalline carbon include graphite, such as amorphous, sheet-like, flake-like, spherical or fibrous natural graphite or artificial graphite, and particular examples of the amorphous carbon include soft carbon (low-temperature baked carbon) or hard carbon, mesophase pitch carbide, baked cokes, or the like.

The metal composite oxide that may be used is selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ (0≤x≤1), $Li_xWO_2$ (0≤x≤1), and $Sn_xMe_{1-x}Me'_yO_z$ (wherein Me is Mn, Fe, Pb, Ge; Me' is Al, B, P, Si, element of Group 1, 2 or 3 in the Periodic Table, halogen; and 0<x≤1; 1≤y≤3; and 1≤z≤8).

The material capable of lithium doping/dedoping may include Si, $SiO_x$(0<x≤2), Si—Y alloy (wherein Y is an element selected from the group consisting of alkali metals, alkaline earth metals, Group 13 elements, Group 14 elements, transition metals, rare earth metal elements and combinations thereof, except Si), Sn, $SnO_2$, Sn—Y (wherein Y is an element selected from the group consisting of alkali metals, alkaline earth metals, Group 13 elements, Group 14 elements, transition metals, rare earth metal elements and combinations thereof, except Sn), or the like. At least one of such materials may be used in combination with $SiO_2$. Element Y may be selected from the group consisting of Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

The transition metal oxide may include lithium-containing titanium composite oxide (LTO), vanadium oxide, lithium vanadium oxide, or the like.

The negative electrode material may be used in an amount of 50-99 wt %, based on 100 wt % of the negative electrode mixture.

The binder is an ingredient which assists binding among the conductive material, active material and the current collector. In general, the binder may be added in an amount of 1-30 wt %, based on 100 wt % of the negative electrode mixture. Particular examples of the binder include polyvinylidene fluoride (PVDF), polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene monomer (EPDM), sulfonated EPDM, styrene-butadiene rubber, fluoro-rubber, various copolymers thereof, or the like.

The conductive material is an ingredient for further improving the conductivity of the negative electrode active material, and may be added in an amount of 1-20 wt %, based on 100 wt % of the negative electrode mixture. The conductive material may be the same or different as the conductive material used for manufacturing the positive electrode. Particular examples of the conductive material include: carbon powder, such as carbon black, acetylene black (or denka black), ketjen black, channel black, furnace black, lamp black or thermal black; graphite powder, such as natural graphite, artificial graphite or graphite having a well-developed crystal structure; conductive fibers, such as carbon fibers or metallic fibers; carbon fluoride; metal powder, such as aluminum or nickel powder; conductive whisker, such as zinc oxide or potassium titanate; conductive metal oxide, such as titanium oxide; and conductive materials, such as polyphenylene derivatives.

The separator functions to interrupt an internal short-circuit between both electrodes and to allow wetting with an electrolyte. The separator may be prepared by mixing a polymer resin, a filler and a solvent to form a separator composition and coating the separator composition directly on the top of an electrode, followed by drying, to form a separator film. In a variant, the separator may be prepared by casting the separator composition on a support, followed by drying, and laminating the separator film separated from the support on the top of an electrode.

The separator may include a conventional porous polymer film, such as a porous polymer film made of a polyolefin-based polymer, including ethylene homopolymer, propylene homopolymer, ethylene/butene copolymer, ethylene/hexene copolymer or ethylene/methacrylate copolymer, and such porous polymer films may be used alone or in the form of a laminate. Otherwise, a conventional porous non-woven web, such as a non-woven web made of high-melting point glass fibers, polyethylene terephthalate fibers, or the like, may be used with no particular limitation.

Herein, the porous separator may generally have a pore diameter of 0.01-50 μm and a porosity of 5-95%. In addition, the porous separator may generally have a thickness of 5-300 μm.

According to the present disclosure, the separator includes a plurality of pores and has porous properties, wherein the pores are filled with the electrolyte as described above, and the electrolyte may show a low crosslinking degree and have flowability, or may show a high crosslinking degree and is in a solid state having no flowability, depending on where the pores are located in the electrode assembly.

Meanwhile, there is no particular limitation in the material or shape of the battery casing. For example, the battery casing may have a cylindrical shape using a can or a prismatic shape. In a variant, the battery casing may have a pouch-like shape using a pouch film or a coin-like shape.

Method for Manufacturing Secondary Battery Hereinafter, the method for manufacturing a secondary battery according to an embodiment of the present disclosure will be explained.

According to an embodiment of the present disclosure, the method for manufacturing a secondary battery includes the steps of:

(S1) introducing an electrode assembly and a composition for forming a gel polymer electrolyte to a battery casing to obtain a preliminary battery;

(S2) carrying out crosslinking of the composition for forming a gel polymer electrolyte; and (S3) cooling the resultant product of step (S2).

Step (S2) may be carried out in a heating device, and the heating device may be preheated to a predetermined temperature before carrying out step (S2).

Meanwhile, the secondary battery obtained from the method includes an electrolyte showing a low crosslinking degree and having flowability in the core portion thereof, and the core portion may be encapsulated with the peripheral portion including a gel polymer electrolyte crosslinked to a predetermined crosslinking degree or higher.

Herein, the term 'preliminary battery' is used in order to differentiate it from a finished product and refers to an intermediate during the manufacturing process.

First, an electrode assembly and a composition for forming a gel polymer electrolyte are prepared, and are received in a battery casing (S1).

The electrode assembly is the same as described with reference to the secondary battery according to the present disclosure. Therefore, for convenience of explanation, description of the electrode assembly is abbreviated. According to an embodiment of the present disclosure, the electrode assembly may be prepared in a jelly-roll shape through winding, or in a stacked or stacked-folded shape, depending on the particular purpose of use or application of the battery.

Although there is no particular limitation, step (S1) may be carried out by injecting the composition for forming a gel polymer electrolyte, after the electrode assembly is received in the battery casing.

According to an embodiment of the present disclosure, the composition for a gel polymer electrolyte may include (a) a lithium salt, (b) a non-aqueous organic solvent, (c) a polymerization initiator, and (d) at least one polymerizable compound selected from the group consisting of a polymerizable monomer, oligomer and copolymer.

Lithium Salt

The lithium salt is used as an electrolyte salt in the lithium secondary battery and as a medium for transporting ions. In general, the lithium salt includes $Li^+$, as a cation, and at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $B_{10}Cl_{10}^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$ and $(CF_3CF_2SO_2)_2N^-$, as an anion.

The lithium salt may be used alone or in combination. The lithium salt may be used in an amount controlled suitably within a generally applicable range. However, the lithium salt may be used at a concentration of 0.5-2 M, particularly 0.9-1.5 M, in the electrolyte in order to obtain an optimized effect of forming a coating film for preventing corrosion on the electrode surface.

Since the composition for a gel polymer electrolyte according to the present disclosure includes a lithium salt at 0.5 M or more, it is possible to reduce the resistance caused by depletion of lithium ions during high-rate charge/discharge. Furthermore, when the concentration of the electrolyte salt in the composition for a gel polymer electrolyte according to the present disclosure satisfies the above-defined range, it is possible to ensure high lithium cation (Li t) ion transportability (i.e. cation transference number) by virtue of an increase in lithium cations present in the composition for a gel polymer electrolyte, and to accomplish an effect of reducing diffusion resistance of lithium ions, thereby realizing an effect of improving cycle capacity characteristics.

Non-Aqueous Organic Solvent

The non-aqueous organic solvent is not particularly limited, as long as it causes minimized decomposition caused by oxidation during the charge/discharge cycles of a secondary battery and can realize desired properties in combination with additives. For example, carbonate-based organic solvents, ether-based organic solvents and ester-based organic solvents may be used alone or in combination.

Among such organic solvent, the carbonate-based organic solvent may include at least one of cyclic carbonate-based organic solvents and linear carbonate-based organic solvents. Particular examples of the cyclic carbonate-based organic solvent may include at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate and fluoroethylene carbonate (FEC). Particularly, the cyclic carbonate-based organic solvent may include a mixed solvent of ethylene carbonate having a high dielectric constant with propylene carbonate having a relatively lower melting point as compared to ethylene carbonate.

In addition, the linear carbonate-based organic solvent is an organic solvent having low viscosity and a low dielectric constant, and typical examples thereof may include at least one organic solvent selected from the group consisting of dimethyl carbonate (DMC), diethyl carbonate (DEC), dipropyl carbonate, ethyl methyl carbonate (EMC), methyl propyl carbonate and ethyl propyl carbonate. Particularly, the linear carbonate-based organic solvent may include dimethyl carbonate.

The ether-based organic solvent may include any one selected from the group consisting of dimethyl ether, diethyl ether, dipropyl ether, methyl ethyl ether, methyl propyl ether and ethyl propyl ether, or a mixture of two or more of them. However, the scope of the present disclosure is not limited thereto.

The ester-based organic solvent may include at least one selected from the group consisting of linear ester-based organic solvents and cyclic ester-based organic solvents.

Particular examples of the linear ester-based organic solvent may include any one organic solvent selected from the group consisting of methyl acetate, ethyl acetate, propyl acetate, methyl propionate, ethyl propionate, propyl propionate and butyl propionate, or a mixture of two or more of them. However, the scope of the present disclosure is not limited thereto.

Particular examples of the cyclic ester-based organic solvent may include any one organic solvent selected from the group consisting of γ-butyrolactone, γ-valerolactone, γ-caprolactone, σ-valerolactone and ε-caprolactone, or a mixture of two or more of them. However, the scope of the present disclosure is not limited thereto.

Among such ester-based solvents, the cyclic carbonate-based compound is a high-viscosity organic solvent and can dissociate the lithium salt in the electrolyte well, and thus may be used preferably. When using such a cyclic carbonate-based compound in the form of a mixture with a low-viscosity and low-dielectric linear carbonate-based compound and linear ester-based compound at a suitable mixing ratio, it is possible to prepare a gel polymer electrolyte having high electrical conductivity preferably.

Polymerization Initiator

The polymerization initiator may include a conventional thermal polymerization initiator or photopolymerization initiator known to those skilled in the art. For example, the polymerization initiator may be decomposed by heat to form radicals and react with the crosslinking agent through free radical polymerization to form a gel polymer electrolyte.

More particularly, non-limiting examples of the polymerization initiator include, but are not limited to: organic peroxides or hydroperoxides, such as benzoyl peroxide, acetyl peroxide, dilauryl peroxide, di-tert-butylperoxide, t-butyl peroxy-2-ethyl-hexanoate, cumyl hydroperoxide and hydrogen peroxide, at least one azo compound selected from the group consisting of 2,2'-azobis(2-cyanobutane), 2,2'-azobis(methylbutyronitrile), 2,2'-azobis(iso-butyronitrile) (AIBN) and 2,2'-azobisdimethyl valeronitrile (AMVN), or the like.

The polymerization initiator is decomposed by heat (e.g. heat of 30-100° C.) or at room temperature (5-30° C.) in a battery to form radicals, and a polymerizable oligomer reacts with an acrylate compound through free radical polymerization to form a gel polymer electrolyte.

The polymerization initiator may be used in an amount of 0.01-20 parts by weight, particularly 0.1-10 parts by weight, based on 100 parts by weight of the polymerizable compound.

When the polymerization initiator is used with a range of 0.01-20 parts by weight, it is possible to increase the conversion into a gel polymer so that gel polymer electrolyte properties may be ensured, and to prevent a pre-gelation reaction so that the wettability of an electrode with an electrolyte may be improved.

Polymerizable Compound

The polymerizable compound, i.e. polymerizable monomer, oligomer or copolymer, is a compound which has a polymerizable functional group selected from the group consisting of vinyl, epoxy, allyl and (meth)acryl groups capable of undergoing polymerization in its structure, and can be converted into a gel phase through polymerization or crosslinking. The polymerizable compound is not particularly limited, as long as it is used conventionally as a monomer, oligomer or copolymer for preparing a gel polymer electrolyte.

Particularly, non-limiting examples of the polymerizable monomer include tetraethylene glycoldiacrylate, polyethylene glycol diacrylate (molecular weight 50-1,4-butanediol diacrylate, 1,6-hexandiol diacrylate, trimethylolpropane triacrylate, trimethylolpropane ethoxylate triacrylate, trimethylolpropane propoxylate triacrylate, ditrimethylolpropane tetraacrylate, pentaerythritol tetraacrylate, pentaerythritol ethoxylate tetraacrylate, dipentaerythritol pentaacrylate, dipentaerythritol hexaacrylate, poly(ethylene glycol) diglycidylether, 1,5-hexadiene diepoxide, glycerol propoxylate triglycidyl ether, vinylcyclohexene dioxide, 1,2,7,8-diepoxy octane, 4-vinylcyclohexene dioxide, butyl glycidyl ether, diglycidyl 1,2-cyclohexanedicarboxylate, ethylene glycol diglycidyl ether, glycerol triglycidyl ether, glycidyl methacrylate, or the like. Such compounds may be used alone or in combination.

In addition, typical examples of the copolymer include at least one selected from the group consisting of allyl 1,1,2,2-tetrafluoroethyl ether (TFE)-co-(2,2,2-trifluoroethyl acrylate), TFE-co-vinyl acetate, TFE-co-(2-vinyl-1,3-dioxolane), TFE-co-vinyl methacrylate, TFE-co-acrylonitrile, TFE-co-vinyl acrylate, TFE-co-methyl acrylate, TFE-co-methyl methacrylate (MMA) and TFE-co-2,2,2-trifluoroethyl acrylate (FA).

The polymerizable compound may be used in an amount of 0.01-10 wt % based on the total weight of the composition for a gel polymer electrolyte. When the content of the polymerizable compound is larger than 10 wt %, gelling may occur in an excessively early time, while injecting the composition for a gel polymer electrolyte to a battery, or the composition may become excessively dense to provide a gel having high resistance. On the contrary, when the content of the polymerizable compound is smaller than 0.01 wt %, gelling occurs hardly.

Additives

In addition, the composition for a gel polymer electrolyte according to the present disclosure may further include supplementary additives capable of forming a more stable ion conductive coating film on the surface of an electrode, if necessary, in order to prevent decomposition of the non-aqueous electrolyte and a collapse of the negative electrode under a high-output environment, or to improve low-temperature high-rate discharge characteristics, high-temperature stability, overcharge-preventing effect, battery swelling-inhibiting effect at high temperature, or the like.

Particularly, typical examples of such supplementary additives may include at least one first additive selected from the group consisting of sultone-based compounds, sulfite-based compounds, sulfone-based compounds, sulfate-based compounds, halogen-substituted carbonate-based compounds, nitrile-based compounds, cyclic carbonate-based compounds, phosphate-based compounds, borate-based compounds and lithium salt-based compounds.

The sultone-based compounds may include at least one compound selected from the group consisting of 1,3-propane sultone (PS), 1,4-butane sulfone, ethene sultone, 1,3-propene sultone (PRS), 1,4-butene sultone and 1-methyl-1,3-propene sultone, and may be used in an amount of 0.3-5 wt %, particularly 1-5 wt %, based on the total weight of the composition for a gel polymer electrolyte. When the content of the sultone-based compounds is larger than 5 wt % in the composition for a gel polymer electrolyte, an excessively thick coating film may be formed on the surface of an electrode, resulting in an increase in resistance and degradation of output. Also, in this case, resistance may be increased due to such an excessive amount of additives in the composition for a gel polymer electrolyte to cause degradation of output characteristics.

The sulfite-based compounds may include at least one compound selected from the group consisting of ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimetyl propylene sulfite, 4,6-diethyl propylene sulfite and 1,3-butylene glycol sulfite, and may be used in an amount of 3 wt % or less, based on the total weight of the composition for a gel polymer electrolyte.

The sulfone-based compounds may include at least one compound selected from the group consisting of divinyl sulfone, dimethyl sulfone, diethyl sulfone, methyl ethyl sulfone and methyl vinyl sulfone, and may be used in an amount of 3 wt % or less, based on the total weight of the composition for a gel polymer electrolyte.

The sulfate-based compounds may include ethylene sulfate (Esa), trimethylene sulfate (TMS), or methyl trimethylene sulfate (MTMS), and may be used in an amount of 3 wt % or less, based on the total weight of the composition for a gel polymer electrolyte.

In addition, the halogen-substituted carbonate-based compounds may include fluoroethylene carbonate (FEC), and may be used in an amount of 5 wt % or less, based on the total weight of the composition for a gel polymer electrolyte. When the content of the halogen-substituted carbonate-based compounds is larger than 5 wt %, cell swelling quality may be degraded.

Further, the nitrile-based compounds may include at least one compound selected from the group consisting of succinonitrile, adiponitrile (Adn), acetonitrile, propionitrile, butyronitrile, veleronitrile, caprylonitrile, heptane nitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile and 4-fluorophenylacetonitrile.

The cyclic carbonate-based compounds may include vinylene carbonate (VC) or vinylethylene carbonate, and may be used in an amount of 3 wt % or less, based on the total weight of the composition for a gel polymer electrolyte. When the content of the cyclic carbonate-based compounds is larger than 3 wt %, cell swelling quality may be degraded.

The phosphate-based compounds may include at least one compound selected from the group consisting of lithium difluoro(bisoxalato)phosphate, lithium difluorophosphate ($LiPO_2F_2$), tetramethyl trimethylsilyl phosphate, trimethylsilyl phosphite, tris(2,2,2-trifluoroethyl)phosphate and tris(trifluoroethyl)phosphite, and may be used in an amount of 3 wt % or less, based on the total weight of the composition for a gel polymer electrolyte.

The borate-based compounds may include lithium oxalyl difluoroborate, and may be used in an amount of 3 wt % or less, based on the total weight of the composition for a gel polymer electrolyte.

The lithium salt-based compounds may include compounds different from the lithium salt contained in the non-aqueous electrolyte, and particularly, at least one compound selected from the group consisting of $LiPO_2F_2$, LiODFB, LiBOB (lithium bisoxalatoborate ($LiB(C_2O_4)_2$) and $LiBF_4$, and may be used in an amount of 3 wt % or less, based on the total weight of the composition for a gel polymer electrolyte.

Further, two or more of the supplementary additives may be used in combination, and the content of the supplementary additives may be 20 wt % or less, particularly 0.1-10 wt %, based on the total weight of the composition for a gel polymer electrolyte. When the content of the supplementary additives is smaller than 0.01 wt %, it is not possible to obtain sufficient effects of improving the low-temperature output, high-temperature storage characteristics and high-temperature life characteristics of a battery. When the content of the supplementary additives is larger than 20 wt %, excessive side reactions may occur in the composition for a gel polymer electrolyte during the charge/discharge of a battery due to an excessive amount of additives. Particularly, when the additives are added in an excessive amount, they cannot be decomposed sufficiently at high temperature, resulting in formation of unreacted materials or precipitate in the electrolyte at room temperature. In this case, side-reactions may occur to cause degradation of the life or resistance characteristics of a secondary battery.

Meanwhile, according to an embodiment of the present disclosure, a step of controlling the oxygen concentration in the battery casing may be further carried out after injecting the electrolyte. Oxygen (02) can inhibit the chain reaction of monomers through radical quenching, when radicals are generated by a thermal initiator, or the like. In other words, the oxygen concentration may be controlled in order to inhibit side reactions including crosslinking of the polymerizable monomers after the electrolyte injection step or the subsequent aging step. According to an embodiment of the present disclosure, the oxygen concentration may be controlled by injecting oxygen to the battery casing, after injecting the composition for gel polymer electrolyte. In a variant, the oxygen concentration may be controlled by sealing the battery casing under ambient pressure. In this manner, the oxygen concentration in the battery may be maintained at a level equal to or higher than the oxygen concentration in the air. Herein, the oxygen concentration may be controlled to a desired level by eliminating a degassing step to allow oxygen contained in the air to remain inside of the battery casing. Meanwhile, such oxygen may be removed subsequently from the battery casing in a suitable step before the gel polymer composition is cured. For example, the oxygen concentration may be reduced by removing oxygen from the battery casing through a vacuum treatment, pressurization or degassing process.

In addition, according to an embodiment of the present disclosure, an aging step of the product of step (S1) may be carried out after injecting the composition for a gel polymer electrolyte. The electrode assembly may be sufficiently wetted with the composition through the aging step, and the whole electrode assembly may be wetted uniformly. The aging step may be carried out for several hours to several days, but is not limited thereto. For example, the aging step may be carried out within 72 hours. According to the present disclosure, the aging step is carried out preferably under a room temperature condition of less than 30° C. in order to prevent pre-gelation.

Meanwhile, according to an embodiment of the present disclosure, after the aging step, the battery casing may be opened partially to carry out at least one step selected from vacuum treatment, pressurization and degassing steps. In this step, oxygen is removed from the electrode assembly, which is beneficial to an increase in crosslinking degree of the peripheral portion in the subsequently performed crosslinking step. According to an embodiment of the present disclosure, the vacuum wetting step may be carried out under a reduced pressure condition of −85 kPa to −99 kPa. In addition, the vacuum wetting step may be carried out within several minutes and may be performed twice or more times. According to an embodiment of the present disclosure, after forming a vacuum atmosphere under a reduced pressure condition of about −95 kPa, the vacuum wetting may be carried out eight times for 1-5 minutes. In addition, the electrolyte may be transported sufficiently even to the fine pores in the electrode or the separator by the vacuum treatment, and thus it is possible to provide an effect of providing the electrode assembly with improved wettability.

Next, the composition for a gel polymer electrolyte is crosslinked (S2). According to the present disclosure, the crosslinking step may be carried out by locating the preliminary battery in a predetermined heating device and allowing the preliminary battery to stand in the device for a predetermined time.

According to an embodiment of the present disclosure, the heating device may be preferably preheated to a predetermined temperature before the preliminary battery is located in the heating device. In this manner, the peripheral portion of the battery may rapidly reach the reaction initiation temperature so that the peripheral portion may be crosslinked preferentially. The preheating step is advantageous to obtain a secondary battery, which includes an electrolyte in a liquid state in the core portion of the battery and also includes a gel polymer electrolyte crosslinked to a predetermined degree or higher in the peripheral portion surrounding the core portion.

According to an embodiment of the present disclosure, the preheating temperature of the heating device may be controlled to the crosslinking initiation temperature or higher. For example, the heating device may be preheated to 50° C. or higher, or 60° C. or higher. The upper limit of the preheating temperature is not particularly limited, but is preferably controlled to such a range that the battery and the ingredients contained therein, such as polymer ingredients or electrolyte ingredients, are not deteriorated. According to an embodiment of the present disclosure, the preheating temperature may be controlled to or lower, preferably 70° C. or lower.

In the battery located in the heating device, while the heat applied from the outside of the battery is conducted sequentially to the inner part of the battery, the electrolyte composition injected to the battery starts to be crosslinked from the outer part of the battery to the inner part of the battery according to the conduction of heat.

Herein, when the battery is introduced to the environment preheated to a predetermined temperature or higher, a gradient of the internal/external temperature of the battery is formed before the heat is conducted to the inner part of the battery. In other words, the outer part of the battery reaches a temperature capable of initiating crosslinking within a relatively shorter time as compared to the inner part of the battery, but the inner part of the battery undergoes a slower increase in temperature and reaches the temperature capable of initiating crosslinking relatively slowly.

Figure 2:
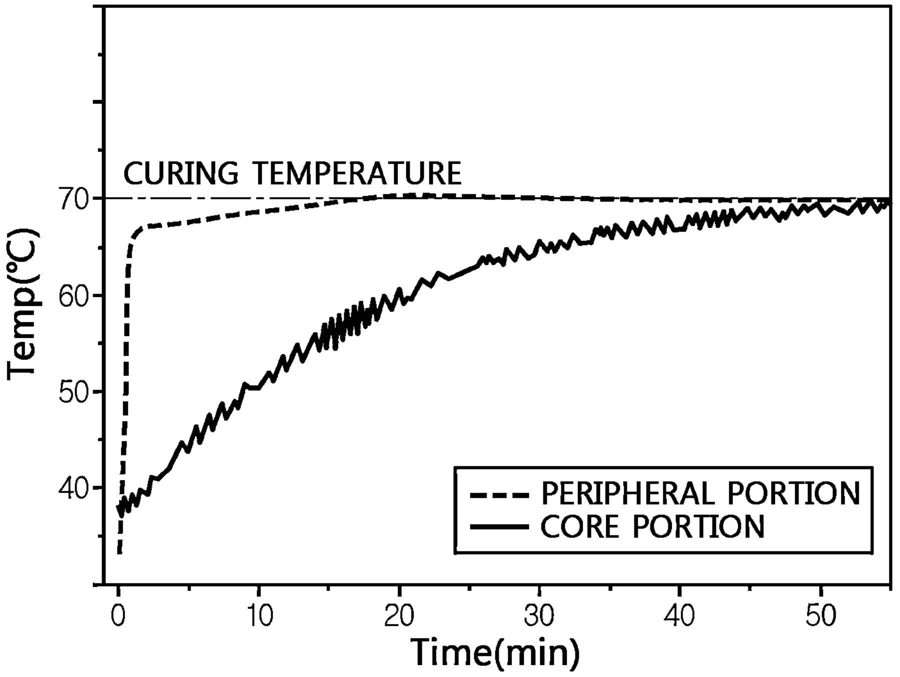
FIG. 2 shows a temperature gradient and a change in temperature of the outer part/inner part of a battery.

Referring to the following examples and FIG. 2, when the secondary battery including an electrolyte composition injected thereto is allowed to react in a chamber preheated to 70° C., the outer part of the battery relatively quickly reaches the temperature capable of crosslinking to ensure a sufficient crosslinking time, while the inner part of the battery is delayed in reaching the temperature capable of crosslinking and starts crosslinking later to ensure a shorter crosslinking time as compared to the outer part.

In this manner, the method for manufacturing a secondary battery according to the present disclosure forms a rapid temperature gradient between the outer part and the inner part of the secondary battery, and thus the peripheral portion may undergo crosslinking sufficiently, and the core portion may be delayed in reaching the temperature capable of crosslinking so that the core portion may be allowed to maintain a low crosslinking degree of electrolyte in the battery.

If the reaction time required for total crosslinking of the battery is about 5 hours, it is possible to control the crosslinking time to a level shorter than the total crosslinking time so that the inner part of the battery may not be crosslinked completely and may maintain a low crosslinking degree. In other words, the method according to the present disclosure uses a different crosslinking degree of a gel composition by using a difference in temperature between the core portion of the battery and the peripheral portion of the battery. As a result, the battery core portion is enriched with electrolyte ingredients having a low crosslinking degree and flowability, and the battery peripheral portion is enriched with electrolyte ingredients having a high crosslinking degree. In this manner, it is possible to improve the durability and safety of the battery at the same time.

In the method for manufacturing a lithium secondary battery according to the present disclosure, step (S2) may be carried out at 50-75° C. According to an embodiment of the present disclosure, step (S2) may be carried out at 60-70° C. Meanwhile, step (S2) may be carried out for 30 minutes to 24 hours. According to an embodiment of the present disclosure, step (S2) may be carried out at 70° C. for 3 hours or less. However, the method is not limited to the above-defined time and temperature ranges, and the reaction time and temperature may be controlled suitably within such ranges that the peripheral portion starts to be crosslinked to show a relatively higher crosslinking degree, while the core portion maintains a relatively lower crosslinking degree as compared to the peripheral portion.

Then, the resultant product of step (S2) is cooled (S3). The cooling means a decrease in the internal temperature of the battery to the reaction temperature of the initiator or lower, for example, a decrease in the temperature to room temperature or lower. Preferably, the cooling may be carried out through a cooling process performed at a rate equal to or higher than the natural cooling rate. According to an embodiment of the present disclosure, the cooling may be carried out by removing the preliminary battery from the heating device, introducing the preliminary battery to a cooling chamber controlled to room temperature or lower, and allowing the internal temperature of the battery to reach the same temperature as the atmosphere temperature of the chamber preferably within 10 minutes. This is intended to prevent undesired crosslinking performed by latent heat. According to an embodiment of the present disclosure, the temperature of the cooling chamber may be controlled to a temperature of 0-20° C. Meanwhile, according to the present disclosure, it is preferred to initiate step (S3) as rapidly as possible after step (S2) in order to prevent crosslinking performed by latent heat after step (S2). The cooling step may be carried out for 30 minutes or more. In other words, with a view to interruption of additional progress of crosslinking, it is preferred to allow the cooling step to be maintained for a predetermined time even after the battery temperature reaches the atmosphere temperature of the cooling chamber.

As described above, the secondary battery obtained from the method for manufacturing a secondary battery according to the present disclosure includes an electrolyte having a lower crosslinking degree in the core portion thereof, and the core portion may be encapsulated with the peripheral portion including a gel electrolyte crosslinked to a predetermined crosslinking degree or higher.

According to the present disclosure, the secondary battery may be a lithium secondary battery, preferably. Non-limiting examples of the lithium secondary battery include a lithium metal secondary battery, a lithium-ion secondary battery, a lithium polymer secondary battery, a lithium-ion polymer secondary battery, or the like.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

(1) Examples 1 and 2

Manufacture of Electrode Assembly

First, 94 wt % of $LiNi_{1/3}Co_{1/3}Mn_{1/3}O_2$ (NCM) as a positive electrode active material, 3 wt % of carbon black as a conductive material and 3 wt % of polyvinylidene fluoride (PVDF) as a binder were added to N-methyl-2-pyrrolidone (NMP) as a solvent to obtain positive electrode active material slurry (solid content: 50 wt %). The positive electrode active material slurry was applied to and dried on aluminum (Al) foil having a thickness of about 20 μm as a positive electrode current collector, followed by roll pressing, to obtain a positive electrode.

In addition, 96 wt % of carbon powder as a negative electrode active material, 3 wt % of PVDF as a binder and 1 wt % of carbon black as a conductive material were added to NMP as a solvent to obtain negative electrode active material slurry (solid content: 80 wt %). The negative electrode active material slurry was applied to and dried on copper (Cu) foil having a thickness of 10 μm as a negative electrode current collector, followed by roll pressing, to obtain a negative electrode.

The positive electrode, the negative electrode and a separator including three layers of polypropylene/polyethylene/polypropylene (PP/PE/PP) were stacked alternately and successively to obtain a stacked electrode assembly including 20 sheets of positive electrodes.

(Preparation of Composition for Gel Polymer Electrolyte)

First, $LiPF_6$ was dissolved in a non-aqueous organic solvent having a composition of ethylene carbonate (EC): ethyl methyl carbonate (EMC)=30:70 (volume ratio) to 1.0 M, thereby preparing a non-aqueous electrolyte. Next, 5 wt % of trimethylolpropane triacrylate as a polymerizable compound and 0.02 wt % of AIBN as a polymerization initiator, based on 100 wt % of the composition for a gel polymer electrolyte, were added to the non-aqueous electrolyte to prepare a composition for a gel polymer electrolyte.

(Manufacture of Lithium Secondary Battery)

The electrode assembly was inserted into a battery casing, and the composition for a gel polymer electrolyte was injected thereto. Next, the battery casing was sealed at 140° C. under ambient pressure for 2 seconds, and was allowed to stand at room temperature for 3 days. Then, the battery casing was partially opened and subjected to vacuum treatment under a reduced pressure condition of −95 kPa eight times for 5 minute to remove oxygen in the battery casing.

After that, the battery was located in a chamber preheated to 70° C. for a predetermined time, and was removed from the chamber to carry out cooling. The cooling step was carried out in a cooling chamber set to 10° C., and it was confirmed that the battery internal temperature reached the internal atmosphere temperature of the cooling chamber within 10 minutes. In this manner, a lithium secondary battery including a gel polymer electrolyte was obtained. The crosslinking temperature and time are shown in the following Table 1. Meanwhile, the battery internal temperature was determined by inserting a microprobe-type temperature measuring device into each of the core portion and the peripheral portion in the battery.

(2) Comparative Example 1

A battery was obtained in the same manner as Example 1, except that the crosslinking reaction and cooling step were not carried out.

(3) Comparative Examples 2-4

A battery was obtained in the same manner as Example 1, except that the crosslinking time was 6 hours in Comparative Example 2, the crosslinking time was 12 hours in Comparative Example 3, and the crosslinking time was 0.5 hours in Comparative Example 4.

(4) Comparative Example 5

A battery was obtained in the same manner as Example 1, except that the cooling step was not carried out.

eral portion. In the case of Comparative Examples 3 and 4, the crosslinking time is excessively long, and the crosslinking degree is high even in the core portion, resulting in poor resistance characteristics.

(3) Test Examples 3-1) Test Example 1: Method for Determining Crosslinking Degree The crosslinking degree of each of the lithium secondary batteries according to Examples 1 and 2 and Comparative Examples 1-5 was determined as follows. After the battery casing of each battery was opened, the electrode assembly was obtained and disintegrated into the peripheral portion and the core portion to provide samples. Then, each sample was introduced to acetone d-6, shaken at room temperature for about 1 hour, and filtered to remove the solid content and to obtain a filtrate. The filtrate was analyzed through NMR to determine the residual amount of unreacted oligomers (based on C═C bond), which was compared with the introduced oligomers. Then, the crosslinking degree was calculated according to the Mathematical Formula 1. Herein, NMR was carried out by $^{1}$H-NMR using Varian 500 MHz. Particularly, 0.1 g of the polymer solution was taken in each test and dissolved in 1 mL of the solvent for NMR as shown hereinafter, and the analysis system as shown hereinafter was used to carry out $^{1}$H-NMR according to the manual of the production company. In the case of unreacted oligomers, —H peaks derived from ═$CH_2$ of the end of double bond appear around at 5.7 ppm and 6.4 ppm.

Analysis system: 500 MHz NMR (Varian Unity Inova 500), $^{1}$H-NMR

Concentration: 10-20 mg/mL, solvent: $CDCl_3$-$d_3$

Temperature: 25° C.

$$\text{Crosslinking degree}(\%)=100-\{(\text{Residual amount of unreacted oligomers}/\text{Introduced oligomers})\times 100\}\quad\text{[Mathematical Formula1]}$$

TABLE 1

| | Ex. 1 | Ex. 2 | Comp. Ex. 1 | Comp. Ex. 2 | Comp. Ex. 3 | Comp. Ex. 4 | Comp. Ex. 5 |
|---|---|---|---|---|---|---|---|
| Crosslinking time (hr) | 3 | 1 | — | 0.5 | 6 | 12 | 3 |
| Crosslinking temperature (° C.) | 70 | 70 | — | 70 | 70 | 70 | 70 |
| Cooling step | Used | Used | — | Used | Used | Used | Not used |
| Crosslinking degree of core portion (inner part of cell) (%) | 35 | 21 | 8 | 10 | 92 | 98 | 72 |
| Crosslinking degree of peripheral portion (outer part of cell) (%) | 92 | 85 | 11 | 32 | 97 | 100 | 94 |

TABLE 2

| | Ex. 1 | Ex. 2 | Comp. Ex. 1 | Comp. Ex. 2 | Comp. Ex. 3 | Comp. Ex. 4 | Comp. Ex. 5 |
|---|---|---|---|---|---|---|---|
| Resistance (mOhm) | 3.4 | 3.1 | 2.9 | 2.9 | 4.4 | 4.5 | 4.0 |
| Life characteristics (%, 100 cycle) | 97.9 | 98.7 | 99.5 | 99.4 | 94.6 | 94.3 | 95.8 |
| Cell stiffness** (%) | 96.3 | 93.0 | 58.3 | 68.1 | 98.6 | 100 | 97.2 |
| Nail (Pass/Total) | 3/3 | 2/3 | 0/3 | 0/3 | 3/3 | 3/3 | 3/3 |

**Stiffness: a value expressed by taking the cell stiffness of Comparative Example 4 as 100%, and measured actually in the unit of gf/mm As can be seen from Table 1, each of Examples 1 and 2 shows a significantly lower crosslinking degree in the core portion as compared to the peripheral portion, and the peripheral portion shows a crosslinking degree of 80% or more. Therefore, it can be seen that each battery shows low resistance and high mechanical strength and excellent life characteristics.

On the contrary, it can be seen that Comparative Example 1 is maintained in a non-crosslinked state, and thus shows good resistance characteristics but significantly low mechanical strength.

Meanwhile, in the case of Comparative Example 5, crosslinking is carried out continuously by the latent heat, since no cooling step is carried out. Therefore, a significantly high crosslinking degree is shown in the core portion, resulting in an increase in resistance.

In the case of Comparative Example 2, the crosslinking time is excessively short, resulting in a significantly low crosslinking degree in both the core portion and the periph- 3-2) Test Example 2: Method for Determining and Calculating Stiffness of Lithium Secondary Battery The stiffness of the lithium secondary battery according to Comparative Example 4 was determined for its central portion by using an instrument of Texture analyzer Ball type at a speed of 10 mm/min in a distance of 1.2 mm with a trigger force of 50 g.

Then, the stiffness of each of the other Examples and Comparative Examples was calculated based on the stiffness of Comparative Example 4 taken as 100%.

3-3) Test Example 3: Evaluation of Safety Through Nail Penetration Test

Each of the lithium secondary batteries according to Examples 1 and 2 and Comparative Examples 1-5 was fully charged at room temperature to 4.4 V, and a nail penetration test was carried out under the condition of GB/T (nail diameter 2.5 mm, penetration speed 6 m/min). The test results are shown in the above Table 2.

What is claimed is:

1. A method for manufacturing a secondary battery containing a gel polymer electrolyte, comprising:

introducing an electrode assembly and a composition for forming the gel polymer electrolyte to a battery casing to obtain a preliminary battery;

carrying out crosslinking of the composition in a heating device that is preheated to a predetermined temperature before the carrying out of the crosslinking; and cooling the crosslinked composition, wherein the gel polymer electrolyte is partially crosslinked and has a crosslinking degree that increases from an inner part of the secondary battery toward an outer part of the secondary battery, wherein the gel polymer electrolyte has an outer portion surrounding a central portion, and the outer portion exhibits a higher crosslinking degree than the central portion, wherein a crosslinking degree of the outer portion is 40 wt % or more, a crosslinking degree of the central portion is less than 40 wt %, wherein the gel polymer electrolyte in the central portion has flowability, and flowability is absent in the gel polymer electrolyte in the outer portion, wherein the composition for forming the gel polymer electrolyte comprises a lithium salt, a non-aqueous organic solvent, a polymerization initiator, and at least one polymerizable compound selected from the group consisting of a polymerizable monomer, oligomer, and copolymer, and wherein the polymerizable monomer, oligomer, or copolymer has an acryl group and is a compound that converts into a gel phase through polymerization or the crosslinking.

2. The method for manufacturing a secondary battery according to claim 1, further comprising sealing the battery casing under ambient pressure to obtain the preliminary battery.

3. The method for manufacturing a secondary battery according to claim 1, wherein the crosslinking is carried out at a temperature of 60° C. or higher.

4. The method for manufacturing a secondary battery according to claim 1, further comprising, before the carrying out of the crosslinking, carrying out aging at room-temperature.

5. The method for manufacturing a secondary battery according to claim 4, further comprising, after the carrying out of the aging, carrying out a vacuum treatment step.

6. The method for manufacturing a secondary battery according to claim 1, wherein the cooling of the crosslinked composition is carried out in a cooling chamber controlled to a temperature that is room temperature or lower in such a manner that a battery temperature reaches an atmosphere temperature of the cooling chamber within 10 minutes.

7. A secondary battery comprising:

a gel polymer electrolyte having a crosslinking degree increasing stepwise or gradually from an inner part of the secondary battery to an outer part of the secondary battery, the gel polymer electrolyte having a first portion having a first crosslinking degree, and a second portion having a second crosslinking degree higher than the first crosslinking degree, a central portion comprising the first portion, and an outer portion surrounding the central portion and comprising the second portion, wherein the second crosslinking degree is 40 wt % or more, and the first crosslinking degree is less than 40 wt %, and wherein the gel polymer electrolyte in the central portion has flowability, and flowability is absent in the gel polymer electrolyte in the outer portion.

8. The secondary battery according to claim 7, wherein the second crosslinking degree is 80 wt % or more.

9. The method for manufacturing a secondary battery according to claim 1, wherein the lithium salt includes $LiPF_6$, and wherein the crosslinking of the composition in the heating device is carried out for 30 minutes to 3 hours.

10. The method for manufacturing a secondary battery according to claim 1, wherein the non-aqueous organic solvent includes ethylene carbonate and ethyl methyl carbonate.

11. The method for manufacturing a secondary battery according to claim 1, wherein the polymerizable compound includes the polymerizable monomer, and wherein the polymerizable monomer includes trimethylolpropane triacrylate.

12. The method for manufacturing a secondary battery according to claim 1, wherein the composition comprises 0.01-10 wt % of the polymerizable compound, based on a total weight of the composition for a gel polymer electrolyte.

13. The method for manufacturing a secondary battery according to claim 1, wherein the composition comprises 0.01-20 parts by weight of the polymerization initiator, based on 100 parts by weight of the polymerizable compound.

14. The method for manufacturing a secondary battery according to claim 1, wherein the composition comprises lithium salt at a concentration of 0.5-2 M.

15. The method for manufacturing a secondary battery according to claim 4, wherein the aging is carried out for a plurality of days.

16. The method for manufacturing a secondary battery according to claim 5, wherein the vacuum treatment step is carried out before the crosslinking of the composition in the heating device is carried out.

17. The secondary battery according to claim 7, wherein the first portion has a viscosity of 0 or more and 20,000 cP or less, and wherein a difference between the first crosslinking degree and the second crosslinking degree is 50 wt % or more.

* * * * *